United States Patent
Kull et al.

(10) Patent No.: US 7,144,090 B2
(45) Date of Patent: Dec. 5, 2006

(54) CHINA TYPE 120 BRAKE VALVE ECP MANIFOLD

(75) Inventors: Robert C. Kull, Olney, MD (US); Patrick L. Gayle, Bowie, MD (US)

(73) Assignee: Wabtec Holding Corporation, Wilmerding, PA (US)

( * ) Notice: Subject to any disclaimer, the term of this patent is extended or adjusted under 35 U.S.C. 154(b) by 70 days.

(21) Appl. No.: 11/125,834

(22) Filed: May 10, 2005

(65) Prior Publication Data

US 2005/0264101 A1    Dec. 1, 2005

Related U.S. Application Data

(60) Provisional application No. 60/575,776, filed on May 28, 2004.

(51) Int. Cl.
*B60T 8/34* (2006.01)
(52) U.S. Cl. ............... 303/118.1; 303/7; 303/20
(58) Field of Classification Search ............ 303/7, 303/118.1, 119.3, 119.1, 119.2, 20
See application file for complete search history.

(56) References Cited

U.S. PATENT DOCUMENTS

| | | | | |
|---|---|---|---|---|
| 4,576,416 | A * | 3/1986 | Muller et al. | 303/15 |
| 6,467,854 | B1 * | 10/2002 | Frank et al. | 303/118.1 |
| 6,582,032 | B1 * | 6/2003 | Haller | 303/119.2 |
| 6,991,001 | B1 * | 1/2006 | Heer | 137/883 |
| 2003/0146661 | A1 * | 8/2003 | Hatch | 303/119.3 |
| 2005/0231026 | A1 * | 10/2005 | Barberis et al. | 303/7 |

* cited by examiner

Primary Examiner—Devon Kramer
(74) Attorney, Agent, or Firm—The Webb Law Firm

(57) ABSTRACT

A China Type 120 Brake Valve ECP Manifold includes a manifold block in fluid communication with at least one source of fluid pressure for communicating fluid pressure signals. A plurality of apertures formed through such manifold block allows fluid communication therethrough. The manifold block is engageable intermediate a pipe bracket and a service portion. A first passageway in such manifold block has fluid communication with a first aperture at a first end and has a second end adjacent an upper face of the manifold block. A second passageway in such manifold block has fluid communication with such service portion at a first end and has a second end adjacent an upper face of the manifold block. A third passageway in such manifold block has fluid communication with a second aperture at a first end and has a second end adjacent an upper face of such manifold block. A fourth passageway in such manifold block has fluid communication with such pipe bracket at a first end, is fluidly connected to such second and such third passageways, and has fluid connections adjacent an upper face of such manifold block. A control module engageable with the manifold block controls a plurality of valve devices, communicates with a car control device and fluid pressure sensing devices having fluid communication with at least one of such first, second, third, and fourth passageways. An exhaust passageway in such manifold block fluidly communicates with the fourth passageway, allowing fluid to exhaust to atmosphere.

19 Claims, 3 Drawing Sheets

CHINA TYPE 120 BRAKE VALVE ECP MANIFOLD

CROSS REFERENCE TO RELATED APPLICATION

This application claims the benefit of U.S. Provisional Application No. 60/575,776, filed May 28, 2004.

BACKGROUND OF THE INVENTION

1. Field of the Invention

The invention generally relates to an insert manifold to control the flow of fluid(s) within a system in which the manifold is incorporated. More particularly, the invention pertains to a manifold designed for installation onto a freight railcar equipped with electrically controlled pneumatic (ECP) brake equipment for allowing ECP controlled braking or pneumatically controlled braking of a railcar.

2. Background of the Invention

China Railways have standardized on a pneumatic air brake valve, called "Type 120", which is similar in overall operation to American Association of Railroads (AAR) pneumatic air brake valves (such as the WABCO ABD), with a pipe bracket, service portion, and emergency valve. The main operating difference between the Type 120 to the ABD and related AAR valves is that the emergency portion provides only vent valve functions, and still relies on the service portion to move air from the reservoir to the brake cylinder. Further, there is no difference in brake cylinder equalization pressure between full service and emergency modes. The pipe bracket also differs from a mechanical viewpoint, with different mounting dimensions.

The Type 120 braking systems utilized in China are of the strictly pneumatic type. However, Electronically Controlled Pneumatics (ECP) braking systems are gaining popularity in the rest of the world, and offer many advantages over pneumatic equipment. It is highly desirable to have the ability to apply ECP equipment to railcars to take advantage of the superior braking and safety capabilities offered by ECP equipment.

The ECP brake equipment on each rail vehicle typically includes a Car ID (CID) which interfaces to the ECP trainline, Car Control Unit (CCD), and ECP Manifold. The ECP Manifold contains the pressure transducers, various pneumatic and electro-pneumatic valves, etc. This equipment is used to monitor the pressures in the brake pipe, the brake cylinder(s), and specific reservoirs, and convert the electrical brake commands into a form usable by the microprocessor. Operating according to its programming code and to the dictates of the brake commands and other electrical signals it has received, the microprocessor controls the aforementioned electro-pneumatic valves in a manner well-known in the brake control art.

The ECP Manifold also includes at least one microprocessor with a serial data and power interface to the CCD. However, the ECP Manifold functions can also be performed without a microprocessor, based upon direct interface from the CCD to each of the electro-pneumatic solenoid valves and pressure transducers. Further, ECP equipment allows the railcar to be operated in the strictly pneumatic mode if desired, or in the event of a loss of power to the ECP equipment.

SUMMARY OF THE INVENTION

The present invention provides a Brake Valve ECP Manifold including a manifold block configured for fluid communication with at least one source of fluid pressure for receiving and transmitting fluid pressure signals. A plurality of apertures is formed through such manifold block for allowing fluid communication directly therethrough. A mechanism is engageable with a pipe bracket and a service portion for securing the manifold block intermediate a pipe bracket and a service portion. A first passageway is disposed in such manifold block in fluid communication with a first one of the plurality of apertures at a first end and has a second end adjacent an upper face of the manifold block for allowing communication of fluid pressure therethrough. A second passageway is disposed in such manifold block in fluid communication with such service portion at a first end and has a second end adjacent an upper face of the manifold block for allowing communication of fluid pressure therethrough. A third passageway is disposed in such manifold block in fluid communication with a second one of the plurality of apertures at a first end and having a second end adjacent an upper face of said manifold block for allowing communication of fluid pressure therethrough. A fourth passageway is disposed in such manifold block in fluid communication with such pipe bracket at a first end and fluidly connected to such second passageway and to such third passageway and having a predetermined plurality of fluid connections adjacent an upper face of such manifold block for allowing communication of fluid pressure therethrough. A control module is engageable with the manifold block for controlling a predetermined plurality of valve devices and for communicating with a car control device and for communicating with a predetermined plurality of fluid pressure sensing devices having fluid communication with at least one of such first, second, third, and fourth passageways. An exhaust passageway is disposed in such manifold block in fluid communication with the fourth passageway for allowing fluid to exhaust to atmosphere.

It is, therefore, one of the primary objects of the present invention to provide a Brake Valve ECP Manifold that allows ECP braking to be utilized on railcars using China Type 120 braking equipment.

It is also an object of the present invention to provide a Brake Valve ECP Manifold that offers improved braking control capabilities on railcars using China Type 120 braking equipment without modification to the current braking equipment.

A further object of the present invention is to provide a Brake Valve ECP Manifold that offers improved braking efficiency on railcars using China Type 120 braking equipment.

Another object of the present invention is to provide a Brake Valve ECP Manifold that offers improved safety capabilities on railcars using China Type 120 braking equipment.

It is still a further object of the present invention to provide a Brake Valve ECP Manifold that offers a manifold designed to be inserted into a railcar using China Type 120 braking equipment for allowing ECP controlled braking or pneumatically controlled braking of a railcar.

It is yet another object of the present invention to provide a Brake Valve ECP Manifold that offers protection from stuck brakes on railcars operating in ECP cut-out mode.

These and various other objects and advantages of this invention will become more readily apparent to those persons skilled in the art after a full reading of the following detailed description, particularly when such description is read in conjunction with the attached drawings as described below and the appended claims.

DESCRIPTION OF THE PREFERRED EMBODIMENT(S)

Figure 1:
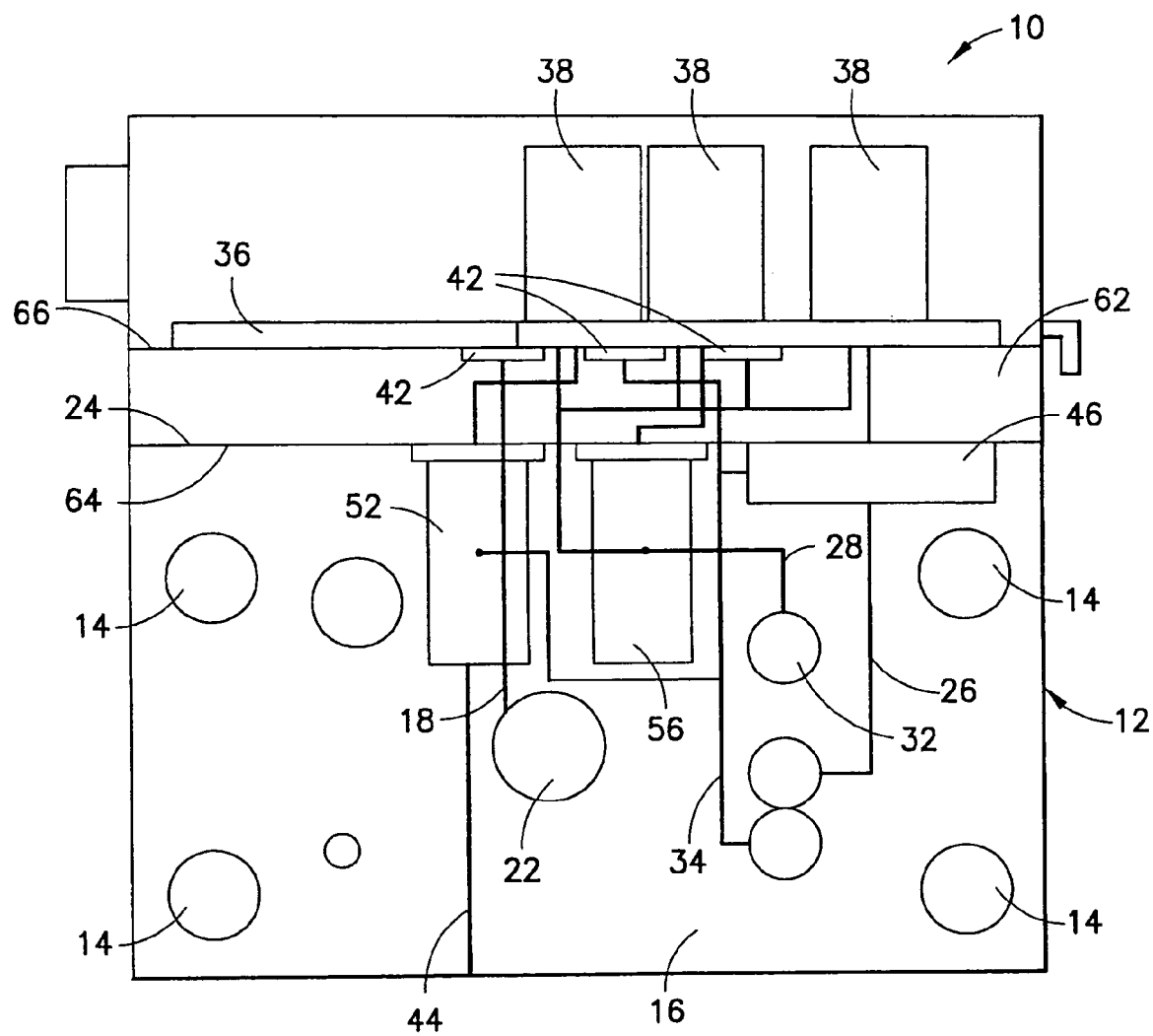
FIG. 1 is a diagrammatic view of a Brake Valve ECP Manifold.
Figure 2:
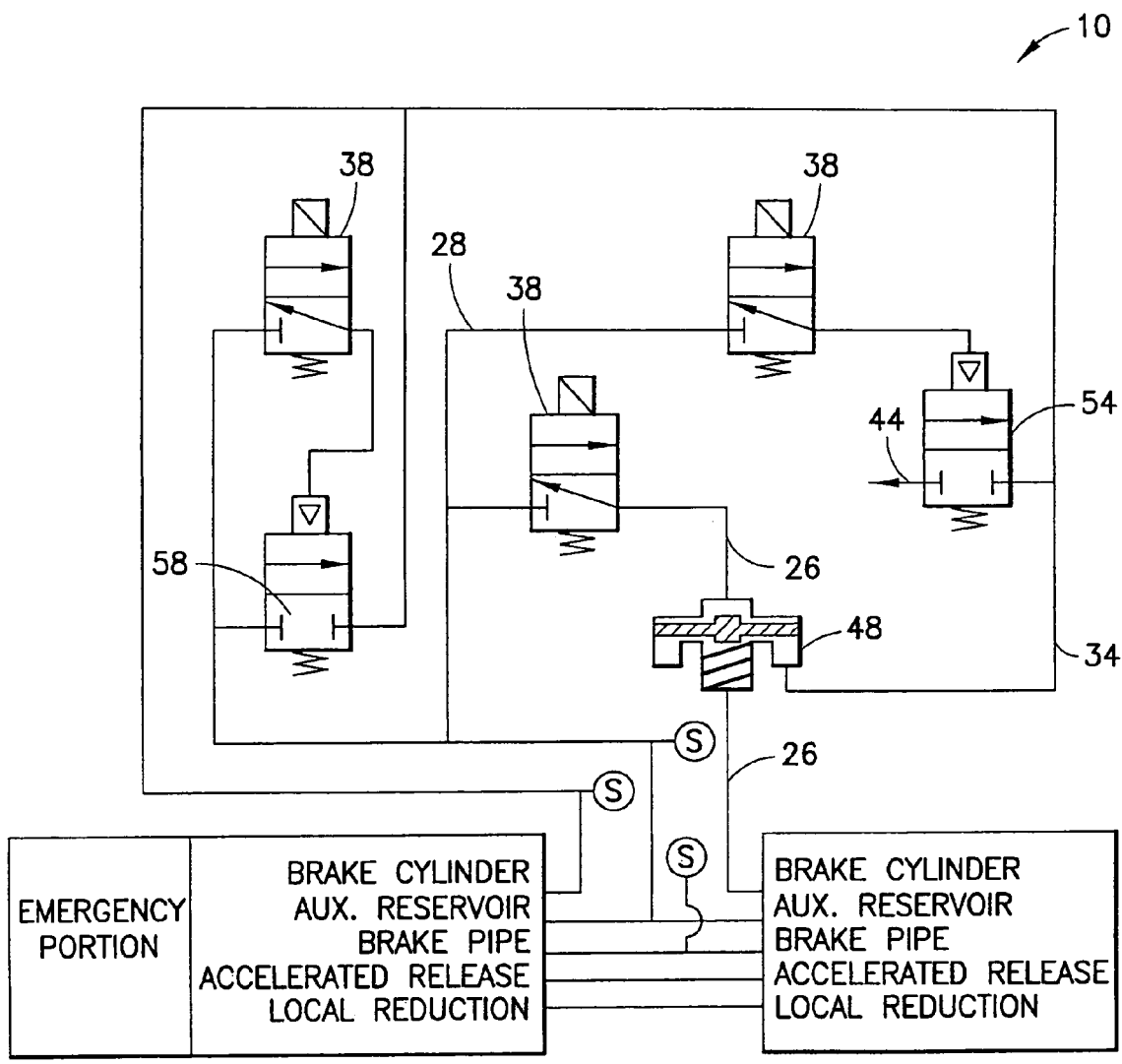
FIG. 2 is a schematical view of a Brake Valve ECP Manifold.
Figure 3:
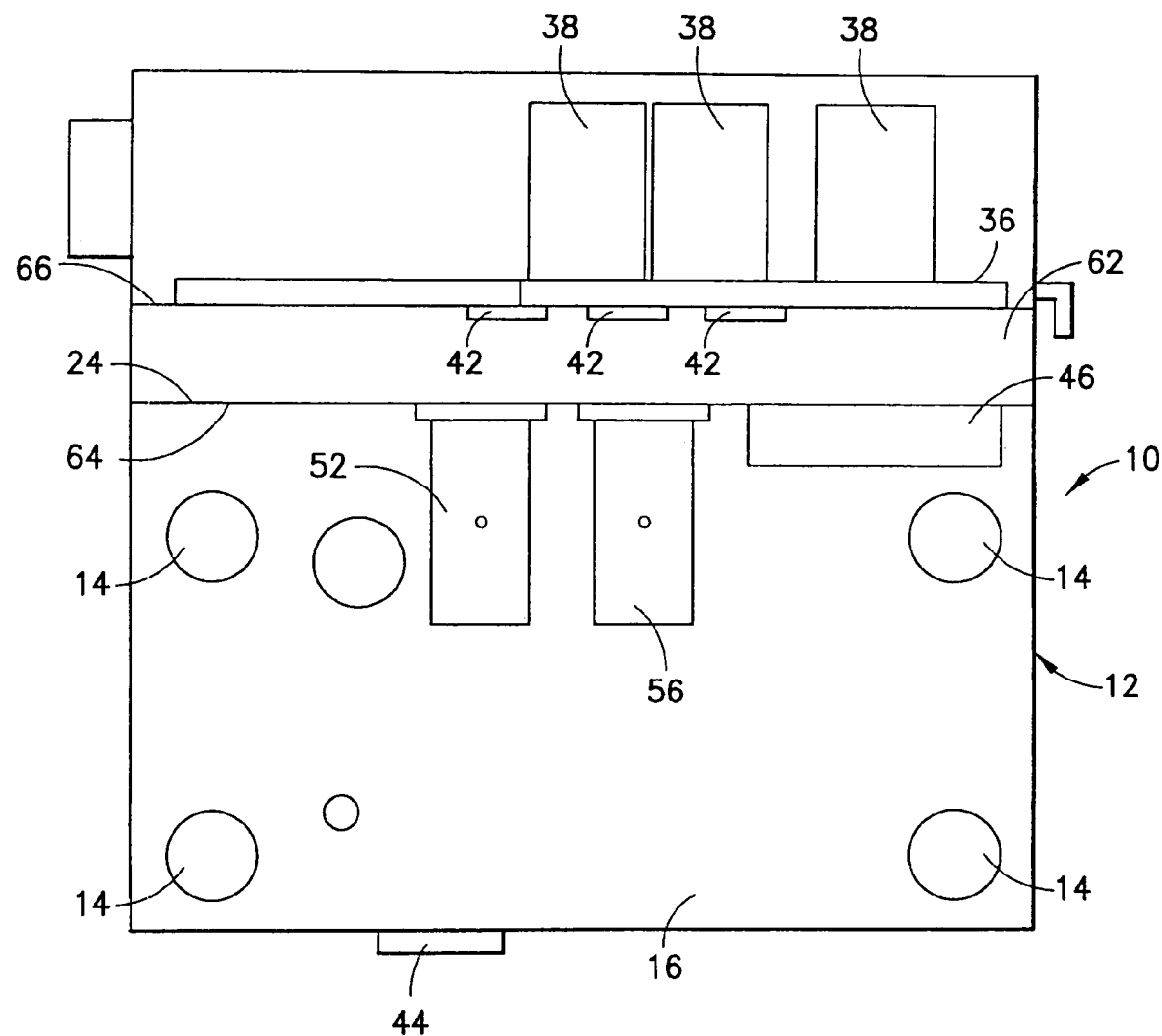
FIG. 3 is a mechanical view of a Brake Valve ECP Manifold.

Prior to proceeding with the more detailed description of the present invention it should be noted that, for the sake of clarity, identical components which have identical functions have been designated by identical reference numerals throughout the drawing Figures.

Reference being made to FIG. 1, a Brake Valve ECP Manifold, generally designated 10, according to a presently preferred embodiment of the present invention is shown. The Brake Valve ECP Manifold 10 provides the means for electronic control of braking while in ECP mode, and returns to conventional pneumatic braking under software control from the ECP system (not shown), or when power is removed from the Brake Valve ECP Manifold 10.

The Brake Valve ECP Manifold 10 includes a manifold block 12 configured for fluid communication with at least one source of fluid pressure for receiving and transmitting fluid pressure signals. A plurality of apertures is formed through manifold block 12 from a pipe bracket face (not shown) to a service portion face 16 for allowing fluid communication directly through such manifold block 12.

The manifold block 12 is one of a machined block of metal and a metal casting, and the metal is selected from the group consisting of aluminum, steel, iron, alloys, and plastics. In a presently preferred embodiment, the metal is aluminum.

A means 14 is engageable with a pipe bracket (not shown) at such pipe bracket face and a service portion (not shown) at such service portion face 16 for securing the manifold block 12 intermediate the pipe bracket and the service portion.

A first passageway 18 is disposed in manifold block 12 and has fluid communication with a first aperture 22 of the plurality of apertures at a first end and has a second end adjacent an upper face 24 of manifold block 12 for allowing communication of fluid pressure therethrough. The first passageway 18 is used by the ECP system (not shown) to monitor brake pipe pressure.

A second passageway 26 is disposed in manifold block 12 and has fluid communication with the service portion at a first end adjacent the service portion face 16 and has a second end adjacent an upper face 24 of manifold block 12 for allowing communication of fluid pressure therethrough. The pressure in second passageway 26 is used as the main pilot valve (not shown) control pressure, and as the source for application of brake cylinder pressure.

A third passageway 28 is disposed in manifold block 12 and has fluid communication with a second aperture 32 of the plurality of apertures at a first end and has a second end adjacent an upper face 24 of manifold block 12 for allowing communication of fluid pressure therethrough. This passageway 28 is used to separate control between conventional pneumatics and electronics under ECP operation.

A fourth passageway 34 is disposed in manifold block 12 and has fluid communication with the pipe bracket at a first end adjacent the pipe bracket face and is fluidly connected to the second passageway 26 and the third passageway 28 and has a predetermined plurality of fluid connections adjacent an upper face 24 of manifold block 12 for allowing communication of fluid pressure therethrough.

A control module 36 engageable with such manifold block 12 is provided to control a predetermined plurality of valve means 38 and for communicating with a car control device (not shown) and for communicating with a predetermined plurality of fluid pressure sensing means 42 having fluid communication with at least one of the first 18, second 26, third 28 and fourth 34 passageways. The fluid pressure sensing means 42 are used to measure brake pipe, brake cylinder, and auxiliary reservoir pressures. Such predetermined plurality of valve means 38 are solenoid type valves and, more specifically, such solenoid valves are a low power, low flow capacity type in a presently preferred embodiment. The control module 36 contains at least one microprocessor (not shown).

Preferably, the control module 36 contains a pair of microprocessors, one of which is redundant and included for safety purposes. The redundant safety checking functions include: pneumatic emergency operation while in ECP mode that ensures the isolation valve assembly 48 is released in the event of a pneumatic emergency; protection from allowing venting of a brake cylinder pressure when a reservoir pressure is below a predetermined level; stuck brake protection when such railcar car is operating with ECP cut-out and the rest of the train is operating with ECP in an operational mode.

The control module 36 further includes brake cylinder fill and vent control logic for controlling brake cylinder filling and venting rates. These brake cylinder filling and venting rates are controlled by time cycling on/off control of said valve means 38 by said control module 36. The control module 36 further includes the ability to modify brake application and release times via software changes.

An exhaust passageway 44 is disposed in manifold block 12 and has fluid communication with fourth passageway 34 for allowing fluid to exhaust to atmosphere.

The Brake Valve ECP Manifold 10 may further include an isolation volume 46 disposed within manifold block 12 and have fluid communication with second passageway 26 and fourth passageway 34 and have an opening adjacent upper face 24 of manifold block 12 for storing a predetermined volume of fluid and containment of an isolation valve assembly 48. In a presently preferred embodiment, such isolation valve assembly 48 is a diaphragm type relay valve assembly. The isolation volume 46 and isolation valve assembly 48 are used to isolate the service portion brake cylinder control from such railcar (not shown) brake cylinder (not shown) while under ECP control.

The Brake Valve ECP Manifold 10 may further include a vent insert chamber 52 disposed within manifold block 12 having fluid communication with exhaust passageway 44 and fourth passageway 34 for storing a predetermined volume of fluid and containment of a vent valve assembly 54 and for controlling the flow of fluid pressure exhausting to atmosphere. The vent valve assembly 54 is an insert-type relay valve assembly in a presently preferred embodiment. The vent insert chamber 52 and vent valve assembly 54 are used for venting brake cylinder pressure to atmosphere.

The Brake Valve ECP Manifold 10 may further include a fill insert chamber 56 disposed within manifold block 12 and having fluid communication with third passageway 28 and fourth passageway 34 for storing a predetermined volume of fluid and containment of a fill valve assembly 58 for controlling the flow of fluid pressure from third passageway 28 to fourth passageway 34. In a presently preferred embodiment, the fill valve assembly 58 is an insert-type relay valve assembly. The fill insert chamber 56 and fill valve assembly 58 are used to control filling brake cylinder pressure from a reservoir (not shown).

The Brake Valve ECP Manifold 10 may further include a coin plate 62 having a first face 64 engageable with upper face 24 of manifold block 12 and having a second face 66 engageable with control module 36 and having fluid communication with at least one of such first 18, second 26, third 28, fourth 34 passageways and such isolation volume 46 for allowing communication of fluid pressure therethrough.

The coin plate 62 is one of a machined block of metal and a metal casting, and the metal is selected from the group consisting of aluminum, steel, iron, alloys, and plastics. In a presently preferred embodiment, the metal is aluminum.

None of the valve means 38 is energized when in ECP cut-out mode, which leaves all control to the service portion, as in normal pneumatic operation. When in ECP running condition, the isolation valve assembly 48 is energized to isolate the brake cylinder control from the pneumatic service portion, and allow electronic control of BC pressure. There is an energy savings mode in ECP operation, which allows the isolation valve assembly 48 to be de-energized when the brakes are released, the brake pipe is steady, and there is no action from the service portion directing air to the brake cylinder. However, when an ECP commanded brake application is made, the isolation valve assembly 48 is energized to isolate any control from the pneumatic service portion. The redundant microprocessor configuration is to protect against electronics failure conditions, and return all valve means 38 to the de-energized condition. In this manner, pneumatic emergency events (drop in brake pipe) will be controlled by the pneumatic service portion.

In ECP mode, brake cylinder control is managed by the predetermined plurality of valve means 38, and the fill 58, vent 54, and isolation 48 valve assemblies to provide the needed flow rates:

Fill: opens the passage from the reservoir to the brake cylinder.

Vent: opens the passage from the brake cylinder to atmosphere.

Isolate: isolates the brake cylinder line from control by the pneumatic service portion, while making ECP brake applications. This maintains control by ECP, independent of the state of the service portion, which may be in a position to fill or vent the brake cylinder, based upon changes in brake pipe pressure.

Stuck brake protection covers the condition of an individual railcar being cut-out of ECP mode while in a train which continues under ECP control. When an ECP brake application is made, the air demand on the brake pipe will result in a loss of pressure, followed by a slow recovery as reservoirs re-charge. The pneumatic service portion could get "stuck" in an application condition based upon the drop of brake pipe pressure, if the subsequent recovery is too slow of a rate to overcome internal friction of the internal slide valve, which is rate sensitive. The ECP Brake Valve Manifold 10 control module 36, using whichever micro-processor which is functional, checks for stuck brake conditions by monitoring the brake cylinder pressure (which should be near zero when ECP is in the cut-out condition). In the event of detecting a stuck brake, the control module 36 will re-set the pneumatic valve by making repeated brake cylinder application/release cycles to reduce the reservoir pressure below the brake pipe pressure, and develop sufficient differential, pressure to overcome the service portion slide valve friction and cause a "re-set" to the release position. The service portion will then remain in the release position, and the ECP Brake Valve Manifold 10 control module 36 will continue to monitor the brake cylinder pressure to insure it stays released.

While the present invention has been described by way of a detailed description of a particularly preferred embodiment, it will be readily apparent to those of ordinary skill in the art that various substitutions of equivalents may be affected without departing from the spirit or scope of the invention set forth in the appended claims.

The invention claimed is:

1. A China Type 120 Brake Valve ECP Manifold, said ECP manifold comprising:
    (a) a manifold block configured for fluid communication with at least one source of fluid pressure for receiving and transmitting fluid pressure signals;
    (b) a plurality of apertures formed through said manifold block from a face of a pipe bracket to a face of a service portion for allowing fluid communication directly through said manifold block;
    (c) a means engageable with said pipe bracket at said face of said pipe bracket and a service portion at said face of said service portion for securing said manifold block intermediate said pipe bracket and said service portion;
    (d) a first passageway (bp) disposed in said manifold block in fluid communication with a first one of said plurality of apertures at a first end and having a second end adjacent an upper face of said manifold block for allowing communication of fluid pressure therethrough;
    (e) a second passageway (bc sp) disposed in said manifold block in fluid communication with said service portion at a first end adjacent said face of said service portion and having a second end adjacent an upper face of said manifold block for allowing communication of fluid pressure therethrough;
    (f) a third passageway (res) disposed in said manifold block in fluid communication with a second one of said plurality of apertures at a first end and having a second end adjacent an upper face of said manifold block for allowing communication of fluid pressure therethrough;
    (g) a fourth passageway (bc pb) disposed in said manifold block in fluid communication with said pipe bracket at a first end adjacent said face of said pipe bracket and fluidly connected to said second passageway and fluidly connected to said third passageway and having a predetermined plurality of fluid connections adjacent an upper face of said manifold block for allowing communication of fluid pressure therethrough;
    (h) a control module engageable with said manifold block for controlling a predetermined plurality of valve means and for communicating with a car control device and for communicating with a predetermined plurality of fluid pressure sensing means having fluid communication with said at least one of said first, said second, said third, and said fourth passageways; and
    (i) an exhaust passageway disposed in said manifold block in fluid communication with said fourth passageway for allowing fluid to exhaust to atmosphere.

2. A China Type 120 Brake Valve ECP Manifold according to claim 1, wherein said Brake Valve ECP Manifold further includes an isolation volume disposed within said manifold block and in fluid communication with said second passageway and said fourth passageway and having an opening adjacent said upper face of said manifold block for storing a predetermined volume of fluid and containment of an isolation valve assembly.

3. A China Type 120 Brake Valve ECP Manifold according to claim 2, wherein said isolation valve assembly is a diaphragm type relay valve assembly.

4. A China Type 120 Brake Valve ECP Manifold according to claim 1, wherein said Brake Valve ECP Manifold further includes a vent insert chamber disposed within said manifold block and in fluid communication with said exhaust passageway and said fourth passageway for storing a predetermined volume of fluid and containment of a vent valve assembly and for controlling the flow of fluid pressure exhausting to atmosphere.

5. A China Type 120 Brake Valve ECP Manifold according to claim 4, wherein said vent valve assembly is an insert-type relay valve assembly.

6. A China Type 120 Brake Valve ECP Manifold according to claim 1, wherein said Brake Valve ECP Manifold further includes a fill insert chamber disposed within said manifold block in fluid communication with said third passageway and said fourth passageway for storing a predetermined volume of fluid and containment of a fill valve assembly for controlling the flow of fluid pressure from said third passageway to said fourth passageway.

7. A China Type 120 Brake Valve ECP Manifold according to claim 6, wherein said fill valve assembly is an insert-type relay valve assembly.

8. A China Type 120 Brake Valve ECP Manifold according to claim 2, wherein said Brake Valve ECP Manifold further includes a coin plate having a first face engageable with said upper face of said manifold block and a second face engageable with said control module and having fluid communication with at least one of said first, said second, said third, said fourth passageways and said isolation volume for allowing communication of fluid pressure therethrough.

9. A China Type 120 Brake Valve ECP Manifold according to claim 1, wherein said predetermined plurality of valve means are solenoid type valves.

10. A China Type 120 Brake Valve ECP Manifold according to claim 9, wherein said solenoid valves are a low power, low flow capacity type.

11. A China Type 120 Brake Valve ECP Manifold according to claim 1, wherein said control module contains at least one microprocessor.

12. A China Type 120 Brake Valve ECP Manifold according to claim 11, wherein said control module contains a pair of microprocessors.

13. A China Type 120 Brake Valve ECP Manifold according to claim 12, wherein a second one of said pair of microprocessors provides redundant safety checking functions.

14. A China Type 120 Brake Valve ECP Manifold according to claim 13, wherein said redundant safety checking functions include pneumatic emergency operation while in ECP mode that insures said isolation valve assembly is released in the event of a pneumatic emergency.

15. A China Type 120 Brake Valve ECP Manifold according to claim 13, wherein said redundant safety checking functions include protection from allowing venting of a brake cylinder pressure when a reservoir pressure is below a predetermined level.

16. A China Type 120 Brake Valve ECP Manifold according to claim 13, wherein said redundant safety checking functions include stuck brake protection when a railcar is operating with ECP cut-out and the rest of the train is operating with ECP in an operational mode.

17. A China Type 120 Brake Valve ECP Manifold according to claim 13, wherein said microprocessor further includes brake cylinder fill and vent control logic for controlling brake cylinder filling and venting rates.

18. A China Type 120 Brake Valve ECP Manifold according to claim 17, wherein said brake cylinder filling and venting rates are controlled by time cycling on/off control of said valve means by said control module.

19. A China Type 120 Brake Valve ECP Manifold according to claim 18, wherein said control module further includes the ability to modify brake application and release times.

* * * * *